(12) United States Patent

Rudnick

(10) Patent No.: US 12,660,762 B1

(45) Date of Patent: Jun. 23, 2026

(54) PACKAGED DELAYED SEED DELIVERY SYSTEM WITH STERILE GROWING MEDIUM

(71) Applicant: Nathan Rudnick, San Leandro, CA (US)

(72) Inventor: Nathan Rudnick, San Leandro, CA (US)

( * ) Notice: Subject to any disclaimer, the term of this patent is extended or adjusted under 35 U.S.C. 154(b) by 452 days.

(21) Appl. No.: 16/792,141

(22) Filed: Feb. 14, 2020

Related U.S. Application Data

(60) Provisional application No. 62/874,413, filed on Jul. 15, 2019, provisional application No. 62/805,311, filed on Feb. 14, 2019.

(51) Int. Cl.
| | |
|---|---|
| *A01G 9/029* | (2018.01) |
| *A01G 24/22* | (2018.01) |
| *A01G 31/02* | (2006.01) |

(52) U.S. Cl.
CPC ........... *A01G 9/0293* (2018.02); *A01G 24/22* (2018.02); *A01G 31/02* (2013.01)

(58) Field of Classification Search
CPC ...... A01G 9/0293; A01G 9/029; A01G 24/22; A01G 31/02
See application file for complete search history.

(56) References Cited

U.S. PATENT DOCUMENTS

| | | | | |
|---|---|---|---|---|
| 2,361,029 A | 10/1944 | Heinl | ........................ | A01G 9/02 47/69 |
| 3,078,985 A * | 2/1963 | Robinson | ............... | B65D 75/02 47/84 |

| | | | | |
|---|---|---|---|---|
| 3,680,256 A * | 8/1972 | Kusumi | ................. | A01G 9/029 47/84 |
| 3,748,783 A | 7/1973 | Sokolles | ................ | A01G 13/04 47/58.1 R |
| 3,753,314 A | 8/1973 | Clark | ..................... | A47G 7/006 47/69 |

(Continued)

FOREIGN PATENT DOCUMENTS

| | | |
|---|---|---|
| CN | 210091286 U | 2/2020 |
| CN | 101278644 A | 11/2020 |

(Continued)

OTHER PUBLICATIONS

JP-2018148831-A machine translation (Year: 2018).*

*Primary Examiner* — Son T Nguyen
(74) *Attorney, Agent, or Firm* — Adibi IP Group, PC; Kian Tanner; Amir V. Adibi

(57) ABSTRACT

A delayed seed to growth medium delivery system comprises a delayed seed to growth medium delivery lid assembly, a container, and an amount of growth medium. The amount of growth medium is disposed along an inside bottom of the container. The delayed seed to growth medium delivery lid assembly is attached to the container thereby sealing the amount of growth medium from an exterior of the container. Activation of the delayed seed to growth medium delivery lid assembly causes seeds stored in the delayed seed to growth medium delivery lid assembly to be deposited onto the growth medium. The seeds undergo a growth process without fungus or bacteria as in typical soil growth and without having to apply costly antimicrobial agents, eliminating the need for watering and maintenance of any kind while plants remain in the container.

17 Claims, 12 Drawing Sheets

DELAYED SEED TO GROWTH MEDIUM
DELIVERY SYSTEM

(56)                    References Cited

U.S. PATENT DOCUMENTS

| 3,961,444 | A | * | 6/1976 | Skaife | .................... | B65D 77/04 |
| | | | | | | 47/84 |
| 4,106,235 | A | | 8/1978 | Smith | .................... | A01G 31/02 |
| | | | | | | 47/66.2 |
| 4,124,953 | A | * | 11/1978 | Patton | ...................... | A01G 9/02 |
| | | | | | | 47/84 |
| 4,291,493 | A | * | 9/1981 | Monson | ................. | A01G 31/02 |
| | | | | | | 47/84 |
| 4,299,054 | A | * | 11/1981 | Ware | ...................... | A01G 31/02 |
| | | | | | | 47/84 |
| 4,790,105 | A | * | 12/1988 | Wareing | ................. | B65D 85/52 |
| | | | | | | 47/84 |
| 5,054,234 | A | | 10/1991 | Cassells | ................. | B65D 85/52 |
| | | | | | | 47/69 |
| 5,525,505 | A | | 6/1996 | Young | .................... | A01H 4/001 |
| | | | | | | 47/69 |
| 8,397,429 | B2 | | 3/2013 | Walli | ...................... | A01G 9/02 |
| | | | | | | 47/66.7 |

| 10,356,984 | B2 | | 7/2019 | Samadpour | .............. | A01C 1/02 |
| 2009/0005245 | A1 | * | 1/2009 | Carlson | .................. | A01H 4/006 |
| | | | | | | 504/100 |
| 2009/0241417 | A1 | | 10/2009 | Smith | ...................... | A01G 9/02 |
| | | | | | | 47/65.5 |
| 2013/0269248 | A1 | * | 10/2013 | Kennedy | ............... | A01G 9/021 |
| | | | | | | 156/249 |
| 2015/0040475 | A1 | * | 2/2015 | Schleeh | .................. | A01G 9/029 |
| | | | | | | 47/65.5 |
| 2016/0198621 | A1 | * | 7/2016 | Ohlund | .................. | A01G 27/04 |
| | | | | | | 47/19.1 |
| 2017/0172081 | A1 | * | 6/2017 | Sramek | ................ | B65D 65/466 |
| 2020/0369452 | A1 | | 11/2020 | Persoon | ................ | B65D 85/34 |

FOREIGN PATENT DOCUMENTS

| EP | 788734 | A1 | | 8/1997 | | |
| ES | 2304312 | A1 | * | 10/2008 | .............. | A01G 9/02 |
| JP | 2018148831 | A | * | 9/2018 | | |

* cited by examiner

DELAYED SEED TO GROWTH MEDIUM
DELIVERY SYSTEM

DELAYED SEED TO GROWTH
MEDIUM DELIVERY SYSTEM
10
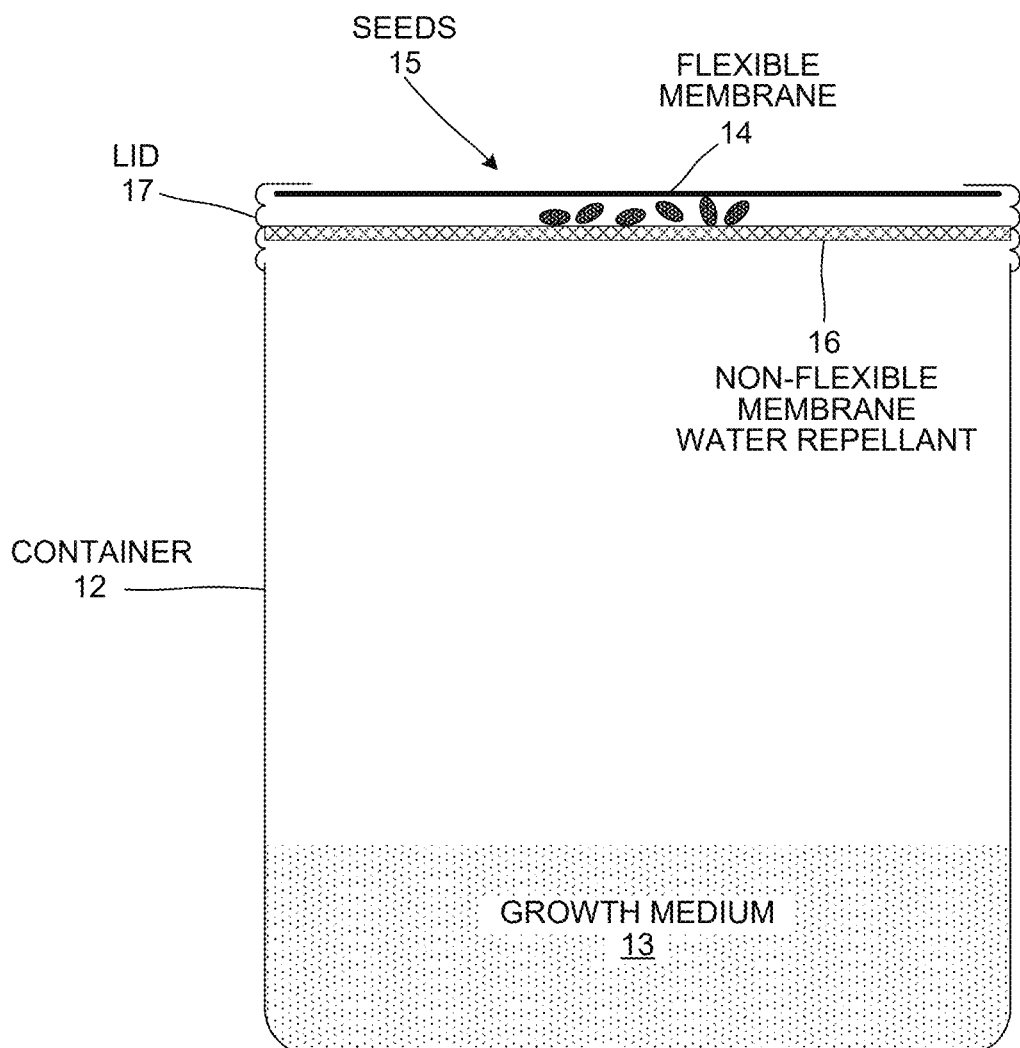
CROSS-SECTIONAL VIEW OF DELAYED SEED
TO GROWTH MEDIUM DELIVERY SYSTEM
(BEFORE DELIVERY)
FIG. 2

CROSS-SECTIONAL VIEW OF DELAYED SEED
TO GROWTH MEDIUM DELIVERY SYSTEM (DELIVERY ACTIVATION)

NON-FLEXIBLE
MEMBRANE
16

FLEXIBLE
MEMBRANE
14

LID
17

19
OPENING

SEEDS DELIVERED
TO GROWTH MEDIUM
THROUGH OPENING
IN NON-FLEXIBLE
MEMBRANE
GENERATED BY
PUNCTURE

CONTAINER
12

GROWTH MEDIUM
13

CROSS-SECTIONAL VIEW OF DELAYED SEED
TO GROWTH MEDIUM DELIVERY SYSTEM
(DELIVERY OF SEEDS TO GROWTH MEDIUM)

NON-FLEXIBLE
MEMBRANE
16

FLEXIBLE
MEMBRANE
14

LID
17

CONTAINER
12

SEEDS DEPOSITED IN
GROWTH MEDIUM

GROWTH MEDIUM
13

CROSS-SECTIONAL VIEW OF DELAYED SEED
TO GROWTH MEDIUM DELIVERY SYSTEM (AFTER DELIVERY)

USING A DELAYED SEED TO GROWTH MEDIUM
DELIVERY SYSTEM TO DELAY SEED DELIVERY

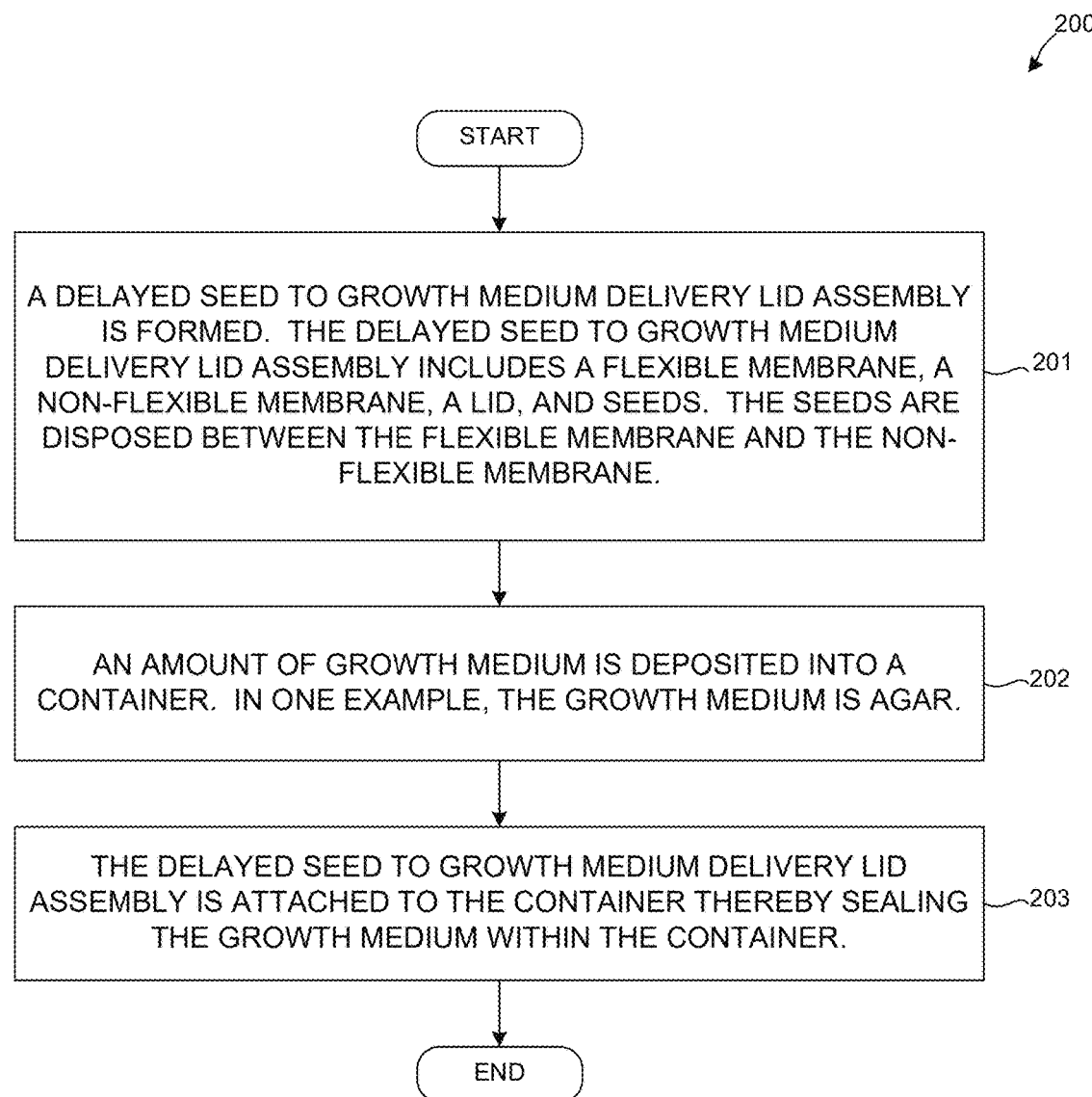

200

START

A DELAYED SEED TO GROWTH MEDIUM DELIVERY LID ASSEMBLY IS FORMED. THE DELAYED SEED TO GROWTH MEDIUM DELIVERY LID ASSEMBLY INCLUDES A FLEXIBLE MEMBRANE, A NON-FLEXIBLE MEMBRANE, A LID, AND SEEDS. THE SEEDS ARE DISPOSED BETWEEN THE FLEXIBLE MEMBRANE AND THE NON-FLEXIBLE MEMBRANE.

201

AN AMOUNT OF GROWTH MEDIUM IS DEPOSITED INTO A CONTAINER. IN ONE EXAMPLE, THE GROWTH MEDIUM IS AGAR.

202

THE DELAYED SEED TO GROWTH MEDIUM DELIVERY LID ASSEMBLY IS ATTACHED TO THE CONTAINER THEREBY SEALING THE GROWTH MEDIUM WITHIN THE CONTAINER.

203

END

FORMING A DELAYED SEED TO GROWTH MEDIUM DELIVERY SYSTEM

FIG. 7

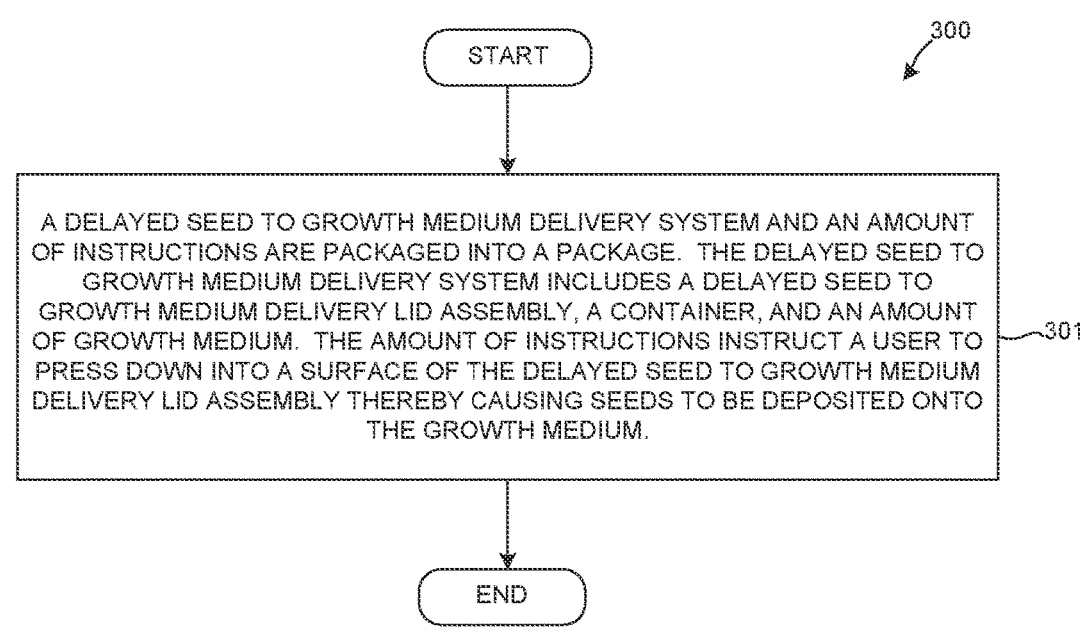

A DELAYED SEED TO GROWTH MEDIUM DELIVERY SYSTEM AND AN AMOUNT OF INSTRUCTIONS ARE PACKAGED INTO A PACKAGE. THE DELAYED SEED TO GROWTH MEDIUM DELIVERY SYSTEM INCLUDES A DELAYED SEED TO GROWTH MEDIUM DELIVERY LID ASSEMBLY, A CONTAINER, AND AN AMOUNT OF GROWTH MEDIUM. THE AMOUNT OF INSTRUCTIONS INSTRUCT A USER TO PRESS DOWN INTO A SURFACE OF THE DELAYED SEED TO GROWTH MEDIUM DELIVERY LID ASSEMBLY THEREBY CAUSING SEEDS TO BE DEPOSITED ONTO THE GROWTH MEDIUM.

PROVIDING A PACKAGED DELAYED SEED TO
GROWTH MEDIUM DELIVERY SYSTEM

FIG. 8

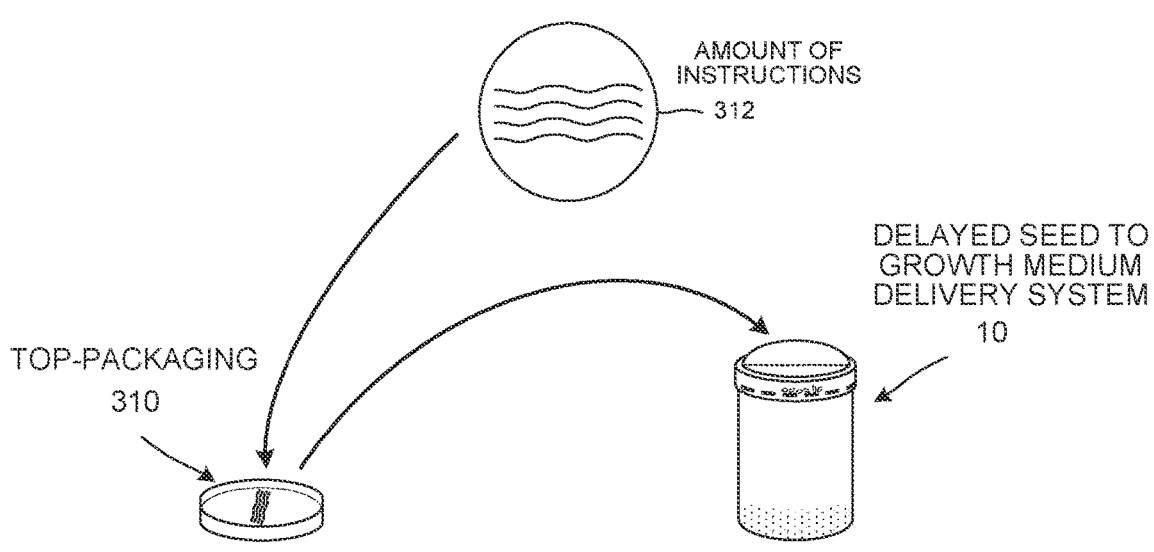

PACKAGED DELAYED SEED TO GROWTH
MEDIUM DELIVERY SYSTEM

FIG. 9

PERSPECTIVE VIEW OF SYSTEM AFTER SEED
DELIVERED TO GROWTH MEDIUM

PERSPECTIVE VIEW SHOWING DELIVERY OF SEED
TO GROWTH MEDIUM

TOP VIEW OF DELAYED SEED TO GROWTH
MEDIUM DELIVERY SYSTEM

PLANT GROWTH IN DELAYED SEED TO GROWTH
MEDIUM DELIVERY SYSTEM

PACKAGED DELAYED SEED DELIVERY SYSTEM WITH STERILE GROWING MEDIUM

CROSS REFERENCE TO RELATED APPLICATIONS

This application claims the benefit under 35 U.S.C. § 119 from U.S. Provisional Patent Application Ser. No. 62/805,311, entitled "Packaged Delayed Seed Delivery System With Sterile Growing Medium," filed on Feb. 14, 2019, the subject matter of which is incorporated herein by reference. This application also claims the benefit under 35 U.S.C. § 119 from U.S. Provisional Patent Application Ser. No. 62/874,413, entitled "Packaged Plant Delivery System With Sterile Growing Medium," filed on Jul. 15, 2019, the subject matter of which is incorporated herein by reference.

TECHNICAL FIELD

The described embodiments relate generally to plant growing techniques.

BACKGROUND INFORMATION

Plants are typically grown by planting seeds in soil. In many conventional environments, plants are susceptible to fungus, bacteria, insects and other pathogens that are harmful to plant growth. One known mechanism to mitigate effects of such pathogens is to apply antimicrobial, antifungal, insecticide agents to plants. However, these types of agents tend to be costly and can impact plant health. A solution that overcomes these challenges is desired. Growing plants from seeds is difficult because more care needs to be given to fragile plants. If water, nutrition or disease problems occur, the plants' growth can slow or even die. As seeds grow, they are much more susceptible to damage. Recovery from damage is also not guaranteed, thus a method that avoids this damage is desirable.

SUMMARY

Systems and techniques for early planting of plants are disclosed. A container is provided that is clean, easy to use, and can be used at any time during the year. Sterilized soil and other substrates suitable for plant growth or plant tissue culture media are optionally included within the container.

In one embodiment, a delayed seed to growth medium delivery system comprises a delayed seed to growth medium delivery lid assembly, a container, and an amount of growth medium. The amount of growth medium is disposed along an inside bottom of the container. The delayed seed to growth medium delivery lid assembly is attached to the container thereby sealing the amount of growth medium from an exterior of the container. Activation of the delayed seed to growth medium delivery lid assembly causes seeds stored in the delayed seed to growth medium delivery lid assembly to be deposited onto the growth medium.

The delayed seed to growth medium delivery system provides a sterile, pathogen free environment where plants can undergo an initial growing process. Use of the novel system provides a growth environment without fungus or bacteria as in typical soil growth. No costly antimicrobial agents need to be used during the initial growing process. Another advantageous aspect is that a user is provided an option to select when the growth process is to begin. The novel system is generated by a first entity in a first location without any seeds in the growth medium. The first entity transports the novel system to a second entity at a second location. The second entity decides when and where the growing process is to begin.

In another embodiment, a delayed seed to growth medium delivery system has a container with agar along an inner base portion of the container and a delayed seed to growth medium delivery lid assembly that includes a flexible membrane, a non-flexible membrane, a lid, and an amount of seeds. The seeds are disposed between the flexible membrane and the non-flexible membrane. The lid assembly is activated by pressing down on an upper surface until the non-flexible membrane is torn or punctured to form an opening. The seeds fall through the opening and onto the agar. After the seeds develop into plants of a desired size, the plants are removed from the container and planted in a desired location.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a cross-sectional diagram of the delayed seed to growth medium delivery system 10 before activation of the seed delivery mechanism.

FIG. 7 is a flowchart of a method 200 in accordance with another novel aspect.

FIG. 8 is a flowchart of a method 300 in accordance with yet another novel aspect.

FIG. 9 is a diagram of a packaged delayed seed to growth medium delivery system.

DETAILED DESCRIPTION

Reference will now be made in detail to some embodiments of the invention, examples of which are illustrated in the accompanying drawings.

Figure 1:
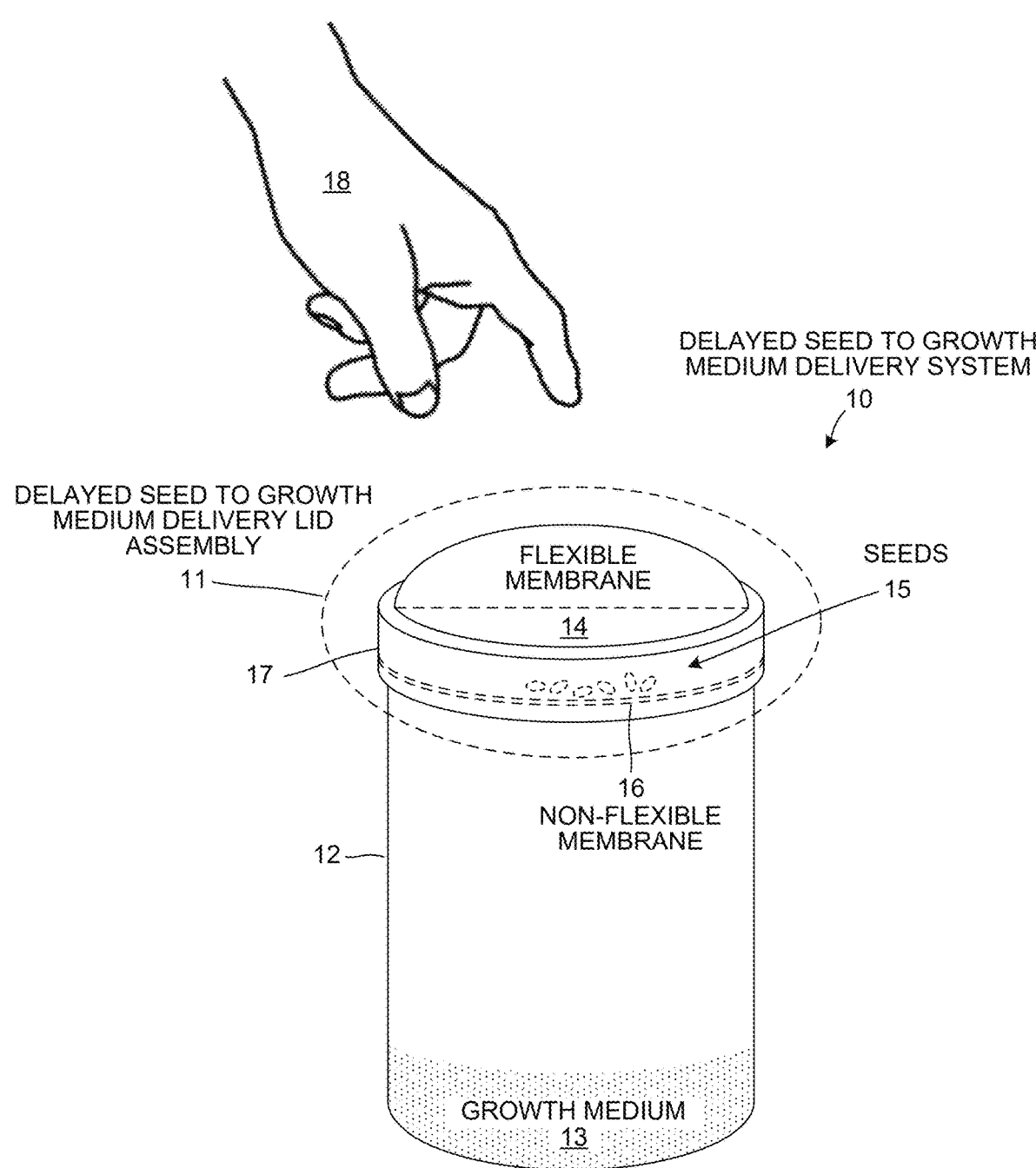
FIG. 1 is a perspective diagram of a delayed seed to growth medium delivery system 10.

FIG. 1 is a perspective diagram of a delayed seed to growth medium delivery system 10. The delayed seed to growth medium delivery system 10 comprises a delayed seed to growth medium delivery lid assembly 11, a container 12, and an amount of growth medium 13. An inside of the container 12 is sterile and sealed from outside conditions by the delayed seed to growth medium delivery lid assembly 11. The growth medium 13 is disposed within the container 12. In one example, the growth medium 13 is tissue culture medium, such as M&S (Murashige and Skoog) agar combined with other growth-related nutrients. Sterile seeds are stored and maintained in the delayed seed to growth medium delivery lid assembly 11 until activation.

The delayed seed to growth medium delivery lid assembly 11 comprises a flexible membrane 14, an amount of sterile seeds 15, a non-flexible membrane 16, and a lid 17. The delayed seed to growth medium delivery lid assembly 11 is attached to an upper end of the container and seals the amount of growth medium 13 from an exterior of the container 12. The seeds 15 are disposed between the flexible membrane 14 and the non-flexible membrane 16.

In accordance with one novel aspect, a user 18 obtains the system 10 without seeds deposited in the growth medium 13. Once the user 18 decides to deposit the seeds 15 and start a growth process, the user 18 activates delivery. In one example, activation of the delayed seed to growth medium delivery lid assembly 11 involves tearing a portion of the non-flexible membrane 16 thereby causing the amount of seeds 15 stored in the delayed seed to growth medium delivery lid assembly 11 to fall onto the amount of growth medium 13. The seeds 15 begin a growth process under the sterile and contained environment provided by the system 10.

FIG. 2 is a cross-sectional diagram of the delayed seed to growth medium delivery system 10 before activation of the seed delivery mechanism. The seeds 15 are disposed between the flexible membrane 14 and the non-flexible membrane 16. The non-flexible membrane 16 supports the seeds 15, which rest above the non-flexible membrane 16.

Figure 3:
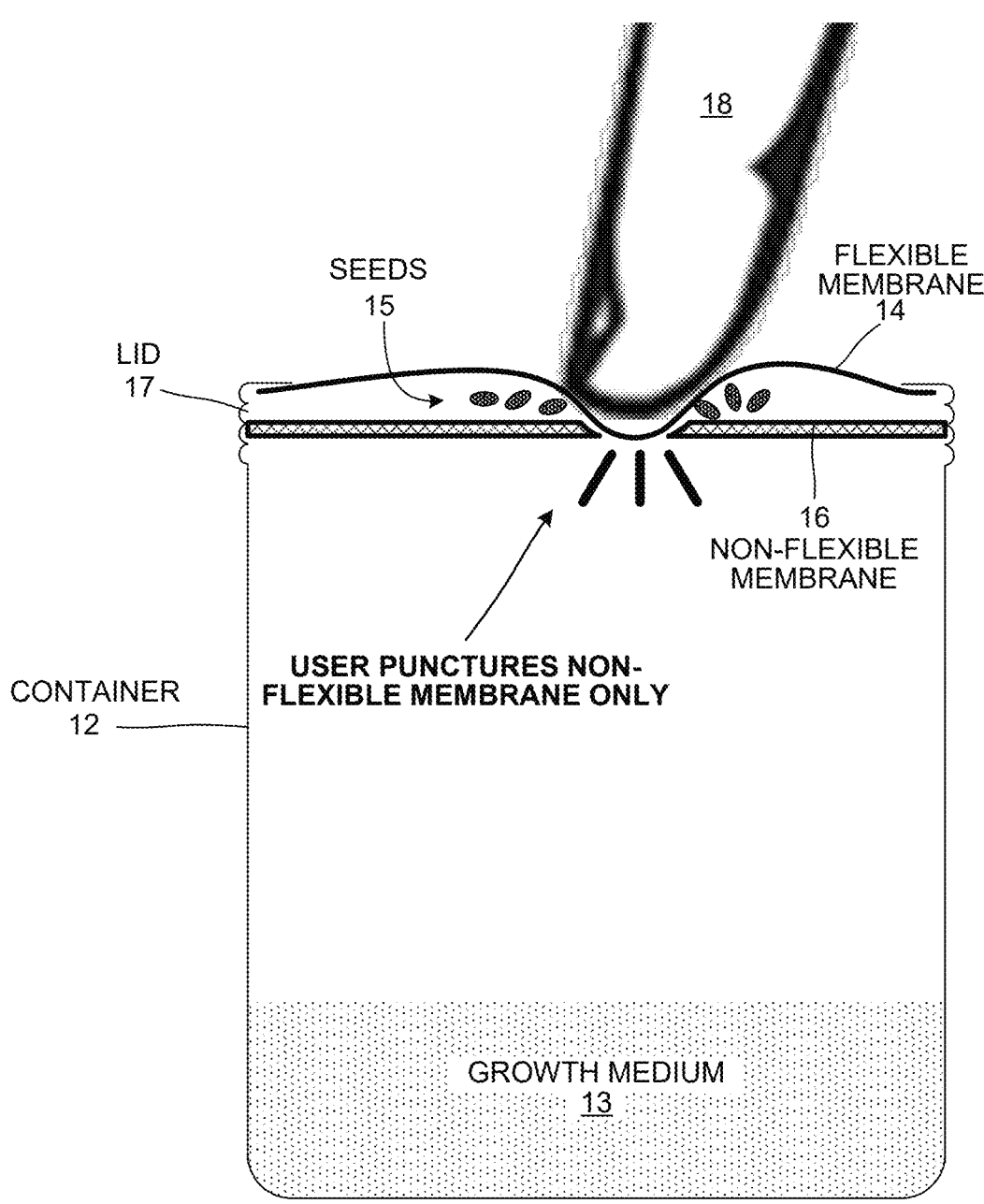
FIG. 3 is a cross-sectional diagram of the delayed seed to growth medium delivery system 10 during activation of the seed delivery mechanism.

FIG. 3 is a cross-sectional diagram of the delayed seed to growth medium delivery system 10 during activation of the seed delivery mechanism. In this example, the activation mechanism involves a user 18 pressing down on the flexible membrane 14 until the non-flexible membrane 16 is torn or punctured.

In another embodiment, a latching mechanism is used instead of a non-flexible membrane. The latching mechanism does not involve tearing or puncturing any membrane. The latching mechanism has a closed state and an open state. Initially, the latching mechanism is in the closed or latched state. Upon activation, the latching mechanism switches to an open or unlatched state causing the seeds 15 to fall onto the growth medium 13. In one example, the latching mechanism is realized with a panel that is maintained shut by a spring and is opened when a force is applied that overcomes a force applied by the spring to maintain the latching mechanism closed.

Figure 4:
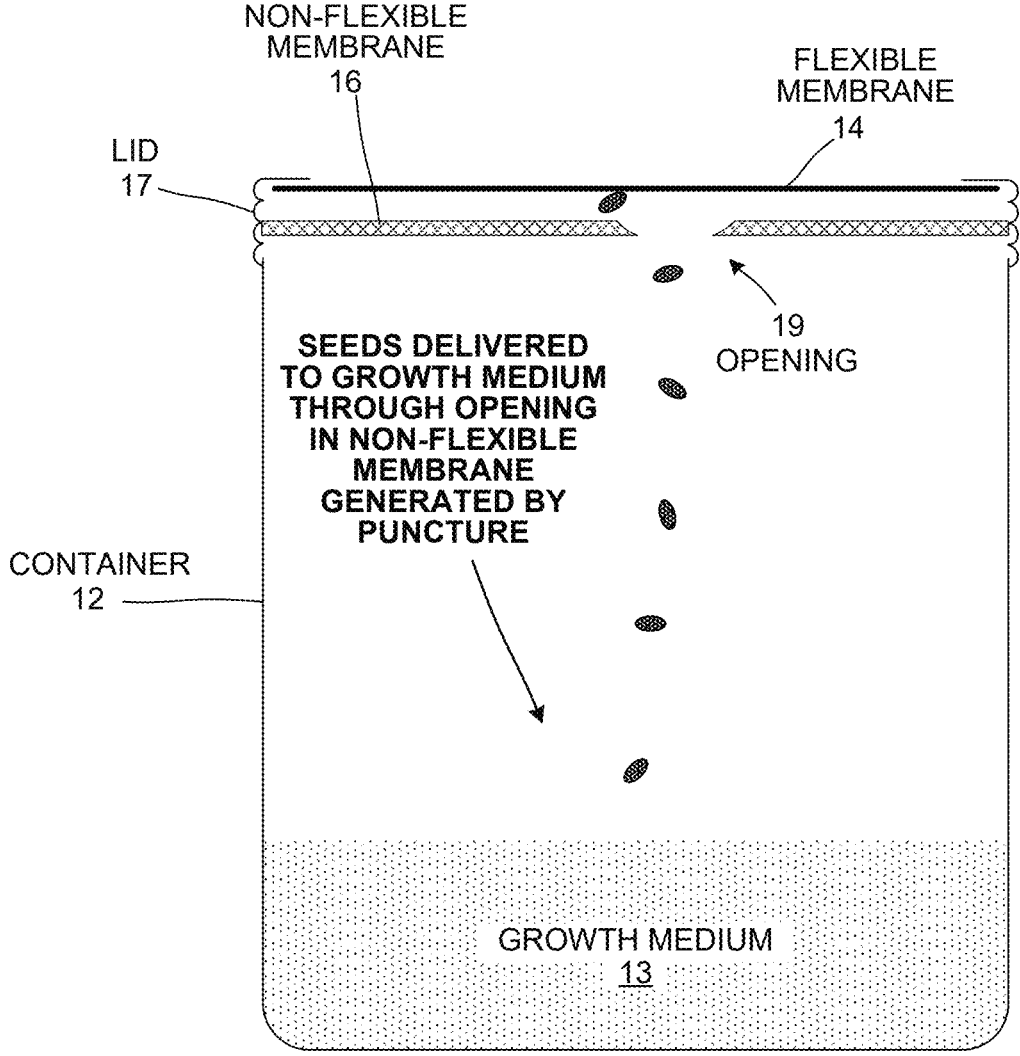
FIG. 4 is a cross-sectional diagram of the delayed seed to growth medium delivery system 10 during delivery of seeds 15 onto the growth medium 13.

FIG. 4 is a cross-sectional diagram of the delayed seed to growth medium delivery system 10 during delivery of seeds 15 onto the growth medium 13. Seeds 15 fall through an opening 19 formed during activation and down onto the growth medium 13.

Figure 5:
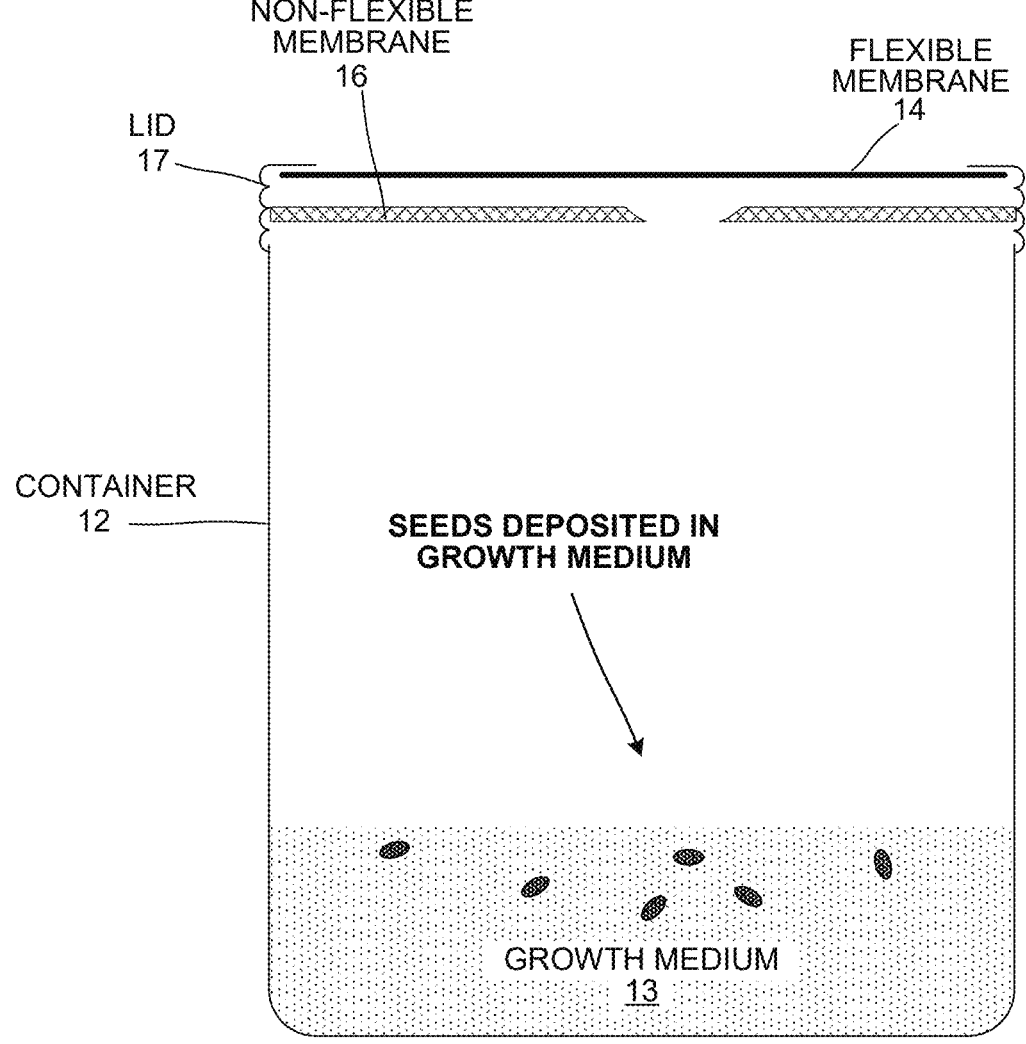
FIG. 5 is a cross-sectional diagram of the delayed seed to growth medium delivery system 10 after seed delivery.

FIG. 5 is a cross-sectional diagram of the delayed seed to growth medium delivery system 10 after seed delivery. The seeds 15 are now embedded in the growth medium 13.

Figure 6:
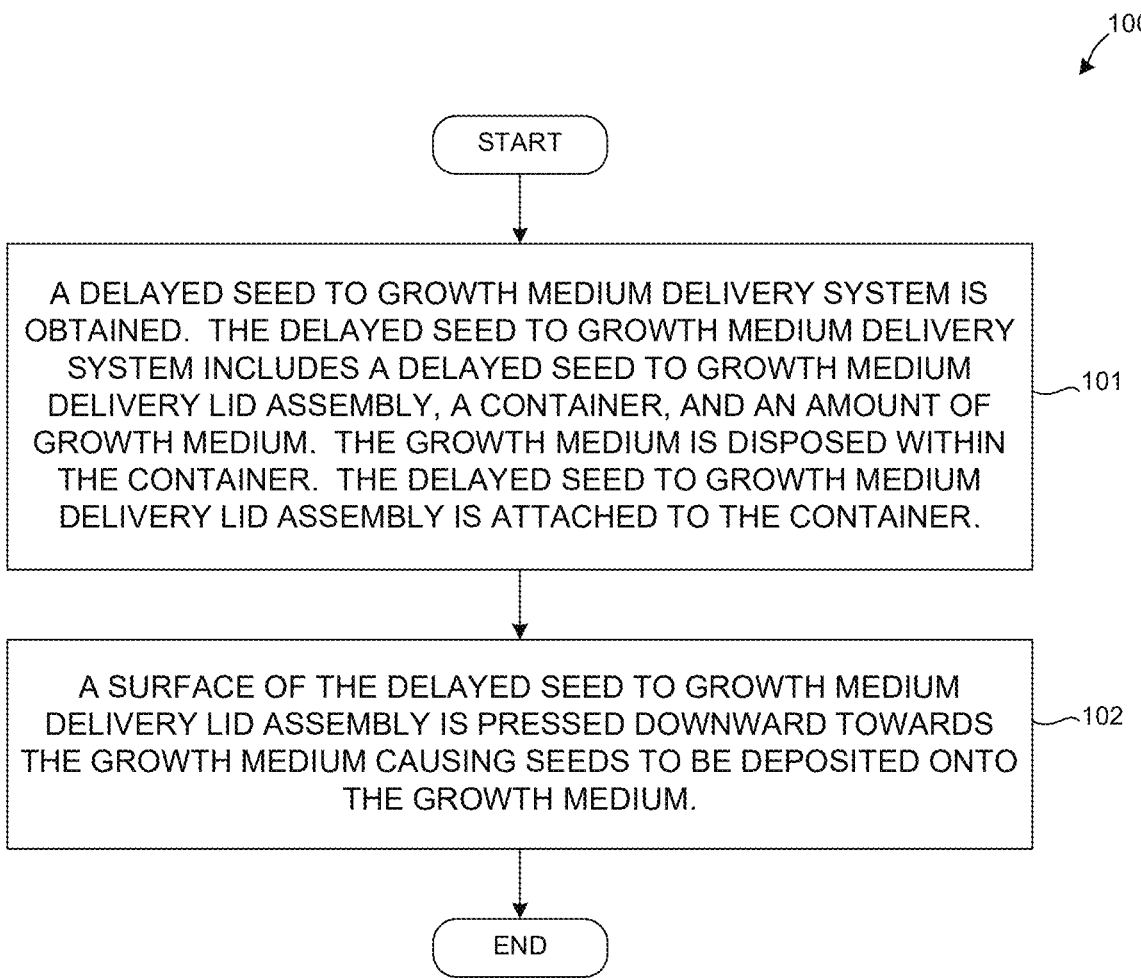
FIG. 6 is a flowchart of a method 100 in accordance with one novel aspect.

FIG. 6 is a flowchart of a method 100 in accordance with one novel aspect. In a first step (step 101), a delayed seed to growth medium delivery system is obtained. The delayed seed to growth medium delivery system includes a delayed seed to growth medium delivery lid assembly, a container, and an amount of growth medium. The growth medium is disposed within the container. The delayed seed to growth medium delivery lid assembly is attached to the container.

In a second step (step 102), a surface of the delayed seed to growth medium delivery lid assembly is pressed downward towards the growth medium causing seeds to be deposited onto the growth medium.

FIG. 7 is a flowchart of a method 200 in accordance with another novel aspect. In a first step (step 201), a delayed seed to growth medium delivery lid assembly is formed. The delayed seed to growth medium delivery lid assembly includes a flexible membrane, a non-flexible membrane, a lid, and seeds. The seeds are disposed between the flexible membrane and the non-flexible membrane.

In a second step (step 202), an amount of growth medium is deposited onto a container. In one example, the growth medium is agar.

In a third step (step 203), the delayed seed to growth medium delivery lid assembly is attached to the container thereby sealing the growth medium within the container.

FIG. 8 is a flowchart of a method 300 in accordance with yet another novel aspect. In a first step (step 301), a delayed seed to growth medium delivery system and an amount of instructions are packaged into a package. The delayed seed to growth medium delivery system includes a delayed seed to growth medium delivery lid assembly, a container, and an amount of growth medium. The amount of instructions instruct a user to press down onto a surface of the delayed seed to growth medium delivery lid assembly thereby causing seeds to be deposited onto the growth medium.

FIG. 9 is a diagram of a packaged delayed seed to growth medium delivery system. The delayed seed to growth medium delivery system is packaged onto package 310 along with an amount of instructions 312. The amount of instructions 312 instruct a user on how to activate the system and cause seeds to be deposited onto the growth medium when desirable. In one example, the amount of instructions 312 direct a user to press down on the flexible membrane until the non-flexible membrane tears or punctures causing the seeds to fall onto the growth medium. The amount of instructions 312 also direct the user to agitate the container after activation until all seeds stored within the delayed seed to growth medium delivery lid assembly fall onto the growth medium.

Figure 10:
FIG. 10 is a diagram of a perspective view showing the delayed seed to growth medium delivery system after the seeds have been deposited onto the growth medium.

FIG. 10 is a diagram of a perspective view showing the delayed seed to growth medium delivery system after the seeds have been deposited onto the growth medium.

Figure 11:
FIG. 11 is a diagram of a perspective view showing activation of the system causing seeds to be deposited onto the growth medium.

FIG. 11 is a diagram of a perspective view showing activation of the system causing seeds to be deposited onto the growth medium.

Figure 12:
FIG. 12 is a diagram of a top view of a delayed seed to growth medium delivery system.

FIG. 12 is a diagram of a top view of a delayed seed to growth medium delivery system. The flexible membrane 14 is shown in FIG. 12.

Figure 13:
FIG. 13 is a diagram of a perspective view showing plant growth in a delayed seed to growth medium delivery system.

FIG. 13 is a diagram of a perspective view showing plant growth in a delayed seed to growth medium delivery system.

Although certain specific exemplary embodiments are described above in order to illustrate the invention, the invention is not limited to the specific embodiments. For example, in other embodiments, a pressure stabilizing mechanism is included that pressurizes or depressurizes the system depending on various elevations the novel system is exposed to. Accordingly, various modifications, adaptations, and combinations of various features of the described embodiments can be practiced without departing from the scope of the invention as set forth in the claims.

What is claimed is:

1. An apparatus comprising:

a container;

a growth medium, wherein the growth medium is disposed within the container; and a delayed seed to growth medium delivery lid assembly, wherein the delayed seed to growth medium delivery lid assembly is attached to the container thereby sealing an entirety of the growth medium within the container, wherein an interior of the sealed container is sterile, wherein activation of the delayed seed to growth medium delivery lid assembly causes seeds to be deposited onto the growth medium, and wherein activation of the delayed seed to growth medium delivery lid assembly does not require unsealing of the container and does not require addition of any liquid or growth of the seeds.

2. The apparatus of claim 1, wherein the delayed seed to growth medium delivery lid assembly comprises a flexible membrane, a non-flexible membrane, a lid, and an amount of seeds.

3. The apparatus of claim 2, wherein the seeds are disposed between the flexible membrane and the non-flexible membrane.

4. The apparatus of claim 2, wherein the non-flexible membrane is made from a tearable material.

5. The apparatus of claim 1, wherein the container has a first end and a second end, wherein the growth medium is disposed along the first end of the container, wherein the delayed seed to growth medium delivery lid assembly is attached to the second end, and wherein the first end is opposite the second end.

6. The apparatus of claim 1, wherein the growth medium is agar with nutritional elements.

7. The apparatus of claim 1, wherein the apparatus is a delayed seed to growth medium delivery system, wherein at a first time a user obtains the delayed seed to growth medium delivery system with seeds stored in the delayed seed to growth medium delivery lid assembly and with no seeds in the growth medium, wherein at a second time the user causes seeds stored in the delayed seed to growth medium delivery lid assembly to be deposited onto the growth medium via activation, and wherein the second time occurs after the first time.

8. A method comprising:

obtaining a delayed seed to growth medium delivery system, wherein the delayed seed to growth medium delivery system comprises a delayed seed to growth medium delivery lid assembly, a container, and growth medium, wherein the growth medium is disposed along a base portion of the container, wherein the delayed seed to growth medium delivery lid assembly is attached to the container thereby sealing all of the growth medium within the container, and wherein an interior of the sealed container is sterile; and causing seeds stored in the delayed seed to growth medium delivery lid assembly to be deposited onto the growth medium.

9. The method of claim 8, wherein the delayed seed to growth medium delivery lid assembly comprises a flexible membrane, a non-flexible membrane, a lid, and an amount of seeds.

10. The method of claim 9, wherein the seeds are disposed between the flexible membrane and the non-flexible membrane.

11. The method of claim 9, wherein seeds are deposited by tearing a portion of the non-flexible membrane such that seeds stored in the delayed seed to growth medium delivery lid assembly fall onto the growth medium.

12. The method of claim 8, wherein the growth medium is agar with nutrition.

13. The method of claim 8, further comprising:

maintaining the delayed seed to growth medium delivery lid assembly attached to the container until seeds deposited onto the growth medium develop into plants over a growth time period.

14. The method of claim 8, wherein causing seeds stored in the delayed seed to growth medium delivery lid assembly to be deposited onto the growth medium does not require unsealing of the container and does not require addition of any liquid or growth of the seeds.

15. A method comprising:

forming a delayed seed to growth medium delivery lid assembly, wherein the delayed seed to growth medium delivery lid assembly includes a flexible membrane, a non-flexible membrane, a lid, and seeds;

depositing growth medium into a container; and attaching the delayed seed to growth medium delivery lid assembly to the container thereby sealing an entirety of the growth medium within the container, wherein the seeds and growth medium are separated by the non-flexible membrane, wherein the seeds are separated from an outer environment by the flexible membrane, and wherein the sealed container provides a sterile environment.

16. The method of claim 15, wherein the seeds are disposed between the flexible membrane and the non-flexible membrane.

17. The method of claim 15, wherein the growth medium is agar, and wherein the agar has growth components with nutrients and is deposited into the container in molten form.

* * * * *